United States Patent
Yamamura et al.

(10) Patent No.: US 8,734,986 B2
(45) Date of Patent: May 27, 2014

(54) LAMINATE TYPE BATTERY

(75) Inventors: Yuichiro Yamamura, Yokosuka (JP);
Hideaki Horie, Yokosuka (JP); Osamu Shimamura, Yokohama (JP); Yasuhiro Yanagihara, Yokohama (JP); Kazuki Miyatake, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1107 days.

(21) Appl. No.: 12/165,905

(22) Filed: Jul. 1, 2008

(65) Prior Publication Data

US 2009/0017376 A1    Jan. 15, 2009

(30) Foreign Application Priority Data

Jul. 11, 2007  (JP) .................. 2007-182542
Mar. 13, 2008  (JP) .................. 2008-064318

(51) Int. Cl.
*H01M 2/20* (2006.01)
*H01M 2/26* (2006.01)

(52) U.S. Cl.
CPC ............. *H01M 2/266* (2013.01); *H01M 2/26* (2013.01); *H01M 2/20* (2013.01)
USPC .......................................... 429/211; 429/209

(58) Field of Classification Search
CPC ........................................................ H01M 2/26
USPC .......... 429/128, 129, 130, 131, 132, 133, 136, 429/137, 140, 141, 142, 143, 144, 146, 147, 429/149, 152, 156, 157, 209
See application file for complete search history.

(56) References Cited

U.S. PATENT DOCUMENTS

| | | | |
|---|---|---|---|
| 2003/0228515 A1* | 12/2003 | Woehrle et al. | 429/160 |
| 2004/0043289 A1* | 3/2004 | Shimamura et al. | 429/162 |
| 2005/0132562 A1 | 6/2005 | Saito et al. | |
| 2005/0170243 A1* | 8/2005 | Ozawa et al. | 429/162 |
| 2005/0233209 A1* | 10/2005 | Sudano et al. | 429/160 |
| 2007/0196732 A1* | 8/2007 | Tatebayashi et al. | 429/181 |

FOREIGN PATENT DOCUMENTS

| | | | | |
|---|---|---|---|---|
| EP | 1 998 400 A2 | 12/2008 | | |
| JP | 9-120842 A | 5/1997 | | |
| JP | 10-255754 A | 9/1998 | | |
| JP | 11-102711 | 4/1999 | | |
| JP | 11-102711 A | 4/1999 | | |
| JP | 2001-297795 A | 10/2001 | | |
| JP | 2004-178914 A | 6/2004 | | |
| WO | WO/2006/068431 | * | 6/2006 | ............ H01M 10/02 |

OTHER PUBLICATIONS

Chinese language First Office Action issued by the State Intellectual Property Office on Dec. 18, 2009 in the corresponding Chinese Application No. 200810132330.0 (7 pages).

* cited by examiner

*Primary Examiner* — Ula C Ruddock
*Assistant Examiner* — Scott J Chmielecki
(74) *Attorney, Agent, or Firm* — Foley & Lardner LLP (57) ABSTRACT

A battery including an electrode and electrode terminal, the electrode comprising a multilayered collector assembly having a multilayered portion that includes an insulation layer and two electrically conductive layers disposed on opposite sides of the insulation layer, and a conductive portion made of an electrically conductive material, connected to the two conductive layers and extending therefrom more toward a side end of the electrode than a side end of the insulation layer so as to be electrically connected to the electrode terminal, and a pair of active material layers disposed on opposite sides of the multilayered portion.

21 Claims, 8 Drawing Sheets

LAMINATE TYPE BATTERY

BACKGROUND OF THE INVENTION

The present invention relates to a laminate type battery and more particularly to improvements in the capacity and durability of the laminate type battery.

In the automotive industry, development of a large-scale lithium ion secondary battery for an electric vehicle (EV) and a hybrid electric vehicle (HEV) is flourishing in recent years, and it has been attempted to increase the energy density and output of the battery. For increase of the energy density, it is effective to make thinner a current collector that is a constituent part of the battery, and it is known such a current collector that is configured to have ion conductive layers disposed on opposite sides of a resin layer that is lighter than a metallic layer and thereby formed thinner than a current collector formed only of metal. An example of such a current collector is disclosed in Unexamined Japanese Patent Publication Nos. 11-102711 and 2001-297795.

SUMMARY OF THE INVENTION

However, if the ion conductive layers are disposed on the opposite sides of the resin layer, there is a difficulty of obtaining sufficient contact between the ion-conductive layers at the time the current collector is connected to an electrode terminal for drawing current to the outside, thus causing a possibility of the contact resistance being increased and the battery capacity being decreased.

It is accordingly an object of the present invention to provide a laminate battery cell that can obtain an excellent capacity without decreasing the volumetric energy density.

To achieve the above object, there is provided according to an aspect of the present invention a battery including an electrode and electrode terminal, the electrode comprising: a multilayered collector assembly having a multilayered portion that includes an insulation layer and two electrically conductive layers disposed on opposite sides of the insulation layer, and a conductive portion made of an electrically conductive material, connected to the two conductive layers and extending therefrom more toward a side end of the electrode than a side end of the insulation layer so as to be electrically connected to the electrode terminal; and a pair of active material layers disposed on opposite sides of the multilayered portion.

According to a further aspect of the present invention, there is provided a laminate type battery comprising: an electrode terminal; and an electrode electrically connected at a side end to the electrode terminal and having a multilayered collector assembly, wherein the multilayered collector assembly includes a multilayered portion having an insulation layer and two electrically conductive layers disposed on opposite sides of the insulation layer, and a conductive portion made of an electrically conductive material and extending between each of the conductive layers and the electrode terminal to electrically connect therebetween, wherein the conductive portion is plate-shaped and widthwise extended along an entire width of the conductive layers so as to contact with the same, and wherein the electrode further includes a pair of active material layers disposed on opposite sides of the multilayered portion.

BRIEF DESCRIPTION OF THE DRAWINGS

FIGS. 2A and 2B are perspective views of a negative electrode and an ion conductive plate that constitute the lithium ion secondary battery of the first embodiment and that are to be joined, wherein FIG. 2A is the view before joining and FIG. 2B is the view after joining;

FIGS. 3A and 3B are perspective views of a negative electrode and an ion conductive plate that constitute a lithium ion secondary battery according to a second embodiment and that are to be joined, wherein FIG. 3A is the view before joining and FIG. 3B is the view after joining;

FIGS. 4A and 4B are perspective views of a negative electrode and an ion conductive plate that constitute a lithium ion secondary battery of a third embodiment and that are to be joined, wherein FIG. 4A is the view before joining and FIG. 4B is the view after joining;

FIGS. 5A and 5B are perspective views of a negative electrode and an ion conductive plate that constitute a lithium ion secondary battery according to a fourth embodiment and that are to be joined, wherein FIG. 2A is the view before joining and FIG. 2B is the view after joining;

FIGS. 6A and 6B are perspective views of a negative electrode and an ion conductive plate that constitute a lithium ion secondary battery according to a fifth embodiment and that are to be joined, wherein FIG. 6A is the view before joining and FIG. 6B is the view after joining;

FIGS. 7A and 7B are perspective views of a negative electrode and an ion conductive plate that constitute a lithium ion secondary battery according to a sixth embodiment and that are to be joined, wherein FIG. 7A is the view before joining and FIG. 7B is the view after joining;

FIGS. 8A and 8B are perspective views of a negative electrode and an ion conductive plate that constitute the lithium ion secondary battery according to a seventh embodiment and that are to be joined, wherein FIG. 8A is the view before joining and FIG. 8B is the view after joining;

FIGS. 9A and 9B are perspective views of a negative electrode and an ion conductive plate that constitute a lithium ion secondary battery according to an eighth embodiment and that are to be joined, wherein FIG. 9A is the view before joining and FIG. 9B is the view after joining;

DESCRIPTION OF THE PREFERRED EMBODIMENTS

Hereinafter, embodiments of the present invention will be described with reference to drawings in which like parts are designated by like reference numerals and repeated description thereto is omitted. Further, in the drawings, the dimensional relation between some parts is different from the actual relation and is somewhat exaggerated for convenience of explanation.

First Embodiment

Figure 1:
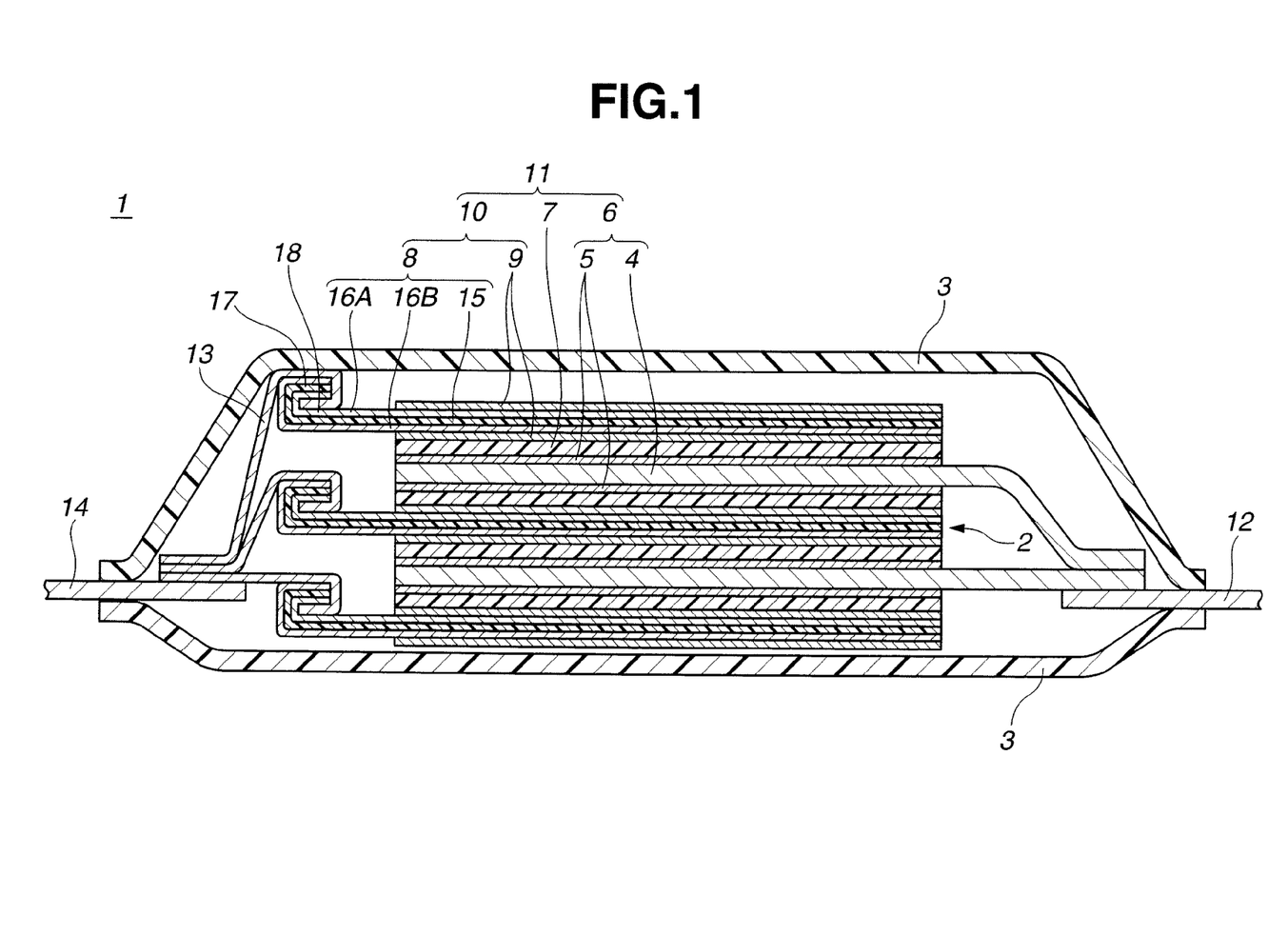
FIG. 1 is a schematic sectional view of a battery element of a lithium ion secondary battery according to an embodiment of the present invention.

As shown in FIG. 1, a laminate type battery 1 of a first embodiment is, for example, a lithium ion secondary battery and configured to include a power generation element or battery element 2 sealed inside an aluminum laminate sheet 3 serving as an exterior covering. The battery element 2 includes a single battery cell 11 consisting of a positive pole (electrode) 6 having a positive collector 4 and a positive pole active material layer 5 formed on the surface of the positive collector 4 and containing a positive pole active material, an electrolyte layer 7 containing an electrolyte material, and a negative pole (electrode) 10 having a negative collector 8 and a negative pole active material layer 9 formed on the surface of the negative collector 8 and containing a negative pole active material. The positive pole 6, the electrolyte layer 7 and negative pole 10 are laminated in this order. Further, the electrolyte layer 7 has a separator adapted to maintain electrolyte liquid and electrolyte liquid maintained in the separator. The positive collector 4 of the battery element 2 is electrically connected to a positive pole terminal (electrode terminal) 12 for drawing current to the outside, and the negative collector 8 is electrically connected to a negative pole terminal (electrode terminal) 14 for drawing current to the outside by way of an electroconductive plate (conductive portion) 13. The positive pole terminal 12 and the negative pole terminal 14 are joined to the positive collector 4 and the electroconductive plate 13 by ultrasonic joining. In the embodiment of FIG. 1, the battery element 2 is made up of four battery cells 11. Further, since in this embodiment the negative poles 10 are arranged so as to constitute the outermost layers of the battery element 2, there exist three negative collectors 8 and two positive collectors 4. In the meantime, while the embodiment of FIG. 1 is shown so that there are laminated three negative collectors 8 and two positive collectors 4, this is only for convenience for illustration and there are actually laminated seven negative collectors 8 and seven positive collectors 4. The battery 1 has a flat rectangular shape and is sized so as to be 210 mm long, 95 mm wide and 5 mm thick. However, the number of the battery cells 11 is not limited but can be determined suitably in consideration of the desired battery capacity and battery output.

The negative collector (multilayered portion) 8 of the lithium ion secondary battery 1 of this embodiment is configured to have a multilayered structure in which a first electrically conductive layer 16A and a second electrically conductive layer 16B, which are made of an electrically conductive material, are disposed on opposite sides of an insulating layer 15 made of an insulating material so as to interpose therebetween the same. The negative collector 8 is formed at an end side for contact with the electroconductive plate 13 with a folded section 17 so as to have at the folded section 17 opposite surface sections between which a spacing is formed. Further, the electroconductive plate 13 is also formed at an end side for contact with the negative collector 8 with a folded section 18 so as to have at the folded section 18 opposite surface sections between which a spacing is formed. The current collector folded section 17 and the conductive plate folded section 18 are joined by engaging one in the spacing of the other and thereby brought into surface-to-surface contact with each other. By this, the electroconductive plate 13 is brought into surface-to-surface contact with both of the first electrically conductive layer 16A and the second electrically conductive layer 16B so that the first electrically conductive layer 16A and the second electrically conductive layer 16B are electrically connected to each other by way of the electroconductive plate 13. Further, the electroconductive plate 13 and the negative collector 8 are joined at the surface-to-surface contact portions thereof by ultrasonic joining to thereby form joining portions 19 (refer to FIG. 2B). In this embodiment, by joining the electroconductive plate (conductive portion) 13 and the negative collector (laminated portion) 8 together, a single multilayered collector assembly is constituted.

Figure 2A:
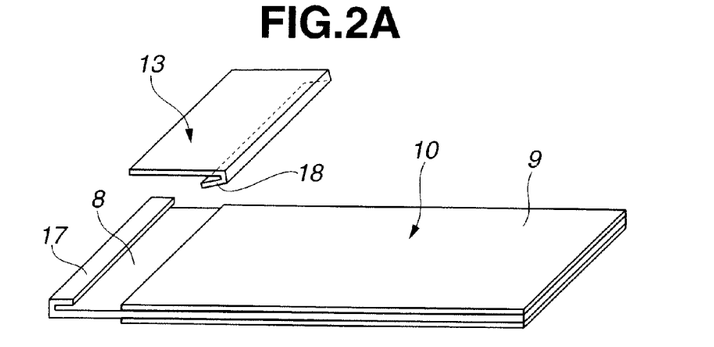
Figure 2B:
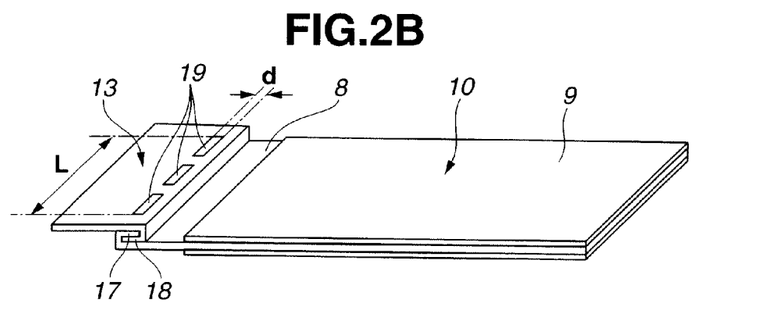

At the time of joining of the electroconductive plate 13 and the negative collector, the negative collector 8 and the electroconductive plate 13 are formed with the folded sections 17 and 18, respectively, as shown in FIG. 2A and thereafter overlaid one upon the other in a way as to lockingly engage one in the spacing of the other. Thereafter, by abuttingly engaging an ultrasonic horn with the overlaid portion under pressure and applying thereto ultrasonic vibration, the joining portions 19 are formed as shown in FIG. 2B. While three separate joining portions 19 are formed in this embodiment, the number of joining portions 19 is not limited but the joining portions 19 are formed so as to have the joining width d and the joining length L. In the meantime, the joining method is not limited to the ultrasonic joining but can be another joining method such as laser welding and resistant welding. A battery that is more excellent in the battery capacity can be obtained as the resistant value between the surface-to-surface contact portions, i.e., the surface-to-surface contact portions of the electroconductive plate 13 and the negative collector 8 in this embodiment is low, and the resistance value is preferably 0.5 MΩ or less.

For the positive collector 4 is used an aluminum foil of 15 μm thick, and for the first electrically conductive layer 16A and the second electrically conductive layer 16B of the negative collector 8 is used copper foil of 3 μm thick. Further, the total thickness of the three-layered structure that constitutes the negative collector 8 and that consists of the first electrically conductive layer 16A, the insulation layer 15 and the second electrically conductive layer 16B is 31 μm. In the meantime, the electrically conductive material for the current collectors 4 and 8 is not limited but an electrically conductive material such as aluminum foil, copper foil and stainless steel (SUS) foil can be used. A battery that is more excellent in the battery capacity can be obtained as the first electrically conductive layer 16A and the second electrically conductive layer 16B are thinner, and preferably the thickness of the first electrically conductive layer 16A and the second electrically conductive layer 16B is in the range from 0.1 μm to 5 μm.

For the insulation layer 15 of the negative collector 8 is used a polyimide film of 25 μm thick. In the meantime, while polyimide that is excellent in the heat resistance is desirable for the insulation layer 15, another resinous material or the like insulation material may be used. Since a battery that is more excellent in the durability and the resistance to vibration can be obtained as the insulation layer 15 is thicker, the thickness of the insulation layer 15 is preferably 5 μm or more.

While a copper foil is used for the electroconductive plate 13, another electrically conductive material such as an aluminum foil and stainless steel (SUS) foil can also be used in place thereof.

While brief description will be made hereinbelow as to other members constituting the lithium ion secondary battery of this embodiment, it is not for the purpose of limitation but other known structures can be employed in place thereof.

[Active Material Layer]

The active material layer contains an active material and further contains additives according to the necessity.

The positive pole active material layer 5 contains a positive pole active material. As a positive pole active material is provided $LiMn_2O_4$ so as to have a thickness of 70 μm. In the meantime, the positive pole active material is not limited to $LiMn_2O_4$ but a lithium-transition metal oxide compound such as $LiNiO_2$, a lithium-transition metal phosphate compound, lithium-transition metal sulfide compound can be used in place thereof. Two or more kinds of positive pole active materials can be used jointly when the occasion demands. In the meantime, it is needless to say that a positive pole active material other than those described above can be used.

The negative pole active layer 9 contains a negative pole active material. As a negative pole active material is provided graphite so as to have a thickness of 12 μm. In the meantime, the negative pole active material is not limited to graphite but in place thereof can be used, for example, carbon materials such as graphite, soft carbon and hard carbon, the above-described lithium-transition metal compounds, metallic materials, lithium-metal alloys, and the like. Two or more kinds of negative pole materials can be used jointly when the occasion demands. In the meantime, it is needless to say that a negative pole active material other than those described above can be used.

Although the average particle size of the active material contained in the respective active material layers 5 and 9 is not limited to a particular value, it is generally in the range from about 0.1 μm to about 100 μm and preferably in the range from 1 μm to 20 μm. However, an active material having an average particle size outside the preferable range can of course be employed.

As an example of the additive contained the positive pole active material layer 5 and the negative pole active material layer 9 can be cited a binder, conductive additive, electrolyte salt (lithium salt) and the like.

As an example of the binder can be cited polyvinylidene fluoride (PvdF), a synthetic rubber binder and the like.

The conductive additive indicates an additive that is contained in the positive pole active material layer 5 and the negative pole active material layer 9 for improving the electrical conductivity thereof. As an example of the conductive additive can be cited graphite, vapor grown carbon fiber and the like.

As an example of electrolyte salt (lithium salt) can be cited $Li(C_2F_5SO_2)_2N$, $LiPF_6$, $LiBF_4$, $LiClO_4$, $LiAsF_6$, $LiCF_3SO_3$ and the like.

As an example of the ion conductive polymer can be cited a polyethylene oxide (PEO) polymer, a polypropylene oxide (PPO) polymer and the like.

The mixing ratio of the components contained in the positive pole active material layer 5 and the negative pole active material layer 9 is not limited. The mixing ratio can be adjusted suitably by reference to the known information concerning the nonaqueous electrolyte secondary battery.

[Electrolyte Layer]

The electrolyte layer 7 in the lithium ion secondary battery 1 of this embodiment consists of a separator and an electrolyte injected into the separator as described above.

The separator has a function of separating the positive and negative active material layers and preventing a short circuit therebetween. The separator consists of, for example, a micro-porous film of polyolefine such as polyethylene and polypropylene. When the occasion demands, the separator may be made of unwoven cloth or particles of the similar material.

There is not any particular limitation to the thickness of the separator but the thickness of the separator can be set suitably in consideration of required performance characteristics of the battery. Specifically, the thickness of the separator is preferably 20 μm or less, more preferably 10 μm or less, and still more preferably 5 μm. On the other hand, although there is not any particular lower limitation to the thickness of the separator, the thickness of the separator is preferably 0.1 μm or more, more preferably 0.5 μm or more and still more preferably 1 μm or more from the point of view of effectively preventing a short circuit between the positive and negative pole active material layers. However, when the occasion demands, the separator having a thickness outside the above-described range can be utilized.

Further, the separator has a function of retaining electrolyte. As electrolyte retained in the separator in the lithium ion secondary battery 1 of this embodiment can be cited liquid electrolyte and gel electrolyte.

The liquid electrolyte includes a non-aqueous solvent (organic solvent) as a plasticizer and lithium salt dissolved in the non-aqueous solvent, as support electrolyte. As the nonaqueous solvent and the lithium salt can be used carbonates such as ethylene carbonate (EC) and propylene carbonate (PC), and compounds such as lithium tetrafluoroborate ($LiBF_4$), which can also be added to the active material layer of the electrode.

The gel electrolyte includes a matrix polymer made up of an ion conductive polymer and the above-described liquid electrolyte injected into the matrix polymer. As the ion conductive polymer that is used as the matrix polymer can be used polymers such as polyethylene oxide (PEO) and polypropylene oxide (PPO), which can also be added to the active material layers of the electrodes.

In the meantime, the matrix polymer of the gel electrolyte can exhibit an excellent mechanical strength when prepared to have a crosslinked structure. For forming the matrix polymer having a crosslinked structure, it will suffice to polymerize the matrix polymer using a suitable polymerization initiator and a polymerization process such as heat polymerization, ultraviolet ray polymerization, radiation polymerization, electron beam polymerization or the like, which is determined depending upon the action factor of the polymerization initiator.

While the electrolyte layer including the separator in which the electrolyte is retained has been described in detail as above, the electrolyte constituting the electrolyte layer 7 of the battery element 2 of the lithium ion secondary battery 1 can be polymer electrolyte. The polymer electrolyte does not require a separator and includes a matrix polymer made of ion conductive polymer and a lithium salt retained in the matrix polymer as electrolyte salt. Since the above-described form can be used similarly as the specific form of the matrix polymer constituting the polymer electrolyte and the lithium salt, repeated description thereto is omitted for brevity.

[Electrode Terminal]

In the lithium ion secondary battery 1, the electrode terminals (positive pole terminal 12 and negative pole terminal 14) are taken out of the laminate sheet 3 for the purpose of drawing current to the outside of the battery.

There is not any limitation to the material constituting the electrode terminals (positive pole terminal 12 and negative pole terminal 14), and known materials having been conventionally used for the electrode terminal for the battery can be used. As an example of a material for constituting the electrode terminal can be cited aluminum, copper, titan, nickel, stainless steel (SUS), alloys of the forgoing metals, and the like. In the meantime, for the positive pole terminal and the negative pole terminal can be used the same material or the different materials.

[Package]

In the lithium ion secondary battery 1, it is desirable to accommodate the battery element 2 within the laminate sheet or the like package for the purpose of protecting the battery 1 from an impact applied thereto from the outside in use and from environmental deterioration. There is not any limitation to the package and a known package can be used. From the point of view of transmitting heat from a heat source of an automotive vehicle to the battery efficiently and heating the inside of the battery up to a battery operating temperature range rapidly, a polymer-metal composite laminate sheet that is excellent in the thermal conductivity or the like is preferably used.

While the lithium ion secondary battery according to a preferred embodiment of the present invention has been described as above with reference to the drawings, the present invention is not limited to the embodiment described as above.

According to the lithium ion secondary battery 1 according to the first embodiment, the electroconductive plate 13 is brought into surface-to-surface contact with both of the first electrically conductive layer 16A and the second electrically conductive layer 16B of the negative collector 8. In this connection, it is to be noted that the electroconductive plate 13 constituting the conductive portion of the multilayered current collector 8 is plate-shaped and widthwise extended along an entire width of the conductive layers 16A and 16B so as to contact with the same. This makes it possible to obtain a sufficient contact area between the electroconductive plate 13 and the first electrically conductive layer 16A and also between the electroconductive plate 13 and the second electrically conductive layer 16B. Accordingly, it becomes possible to realize a thin current collector having a multilayered structure while retaining sufficient electric conduction between the first electrically conductive layer 16A and the second electrically conductive layer 16B through a wide contact area therebetween, and therefore the contact resistance can be reduced without causing reduction in the volumetric energy density of the battery for thereby attaining an excellent battery capacity.

Further, since the joining portions 19 are provided at the folded sections 17 and 18, the surface contact can be attained more assuredly.

Further, since the electroconductive plate 13 which is a part independent from the negative pole terminal 14 and the negative collector 8 is disposed therebetween, it can absorb vibrations to be transmitted from the negative pole 14 to the negative collector 8 efficiently, thus making it possible to improve the durability and the resistance to vibration. Particularly, since in this embodiment the folded sections 17 and 18 are overlaid in a way as to engage one in the spacing of the other, an excellent strength reliability can be attained.

Further, while in this embodiment the negative collector has a multilayered structure in which the insulating layer made of an insulating material is interposed between the first electrically conductive layer and the second electrically conductive layer which are made of an electrically conductive material, the positive collector may also have a similar multilayered structure.

Second Embodiment

Figure 3A:
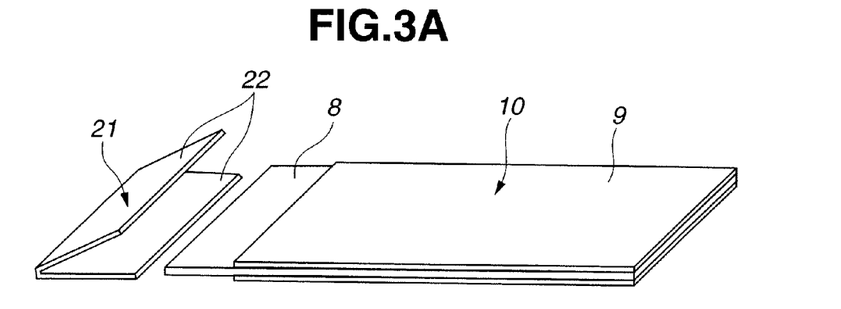
Figure 3B:
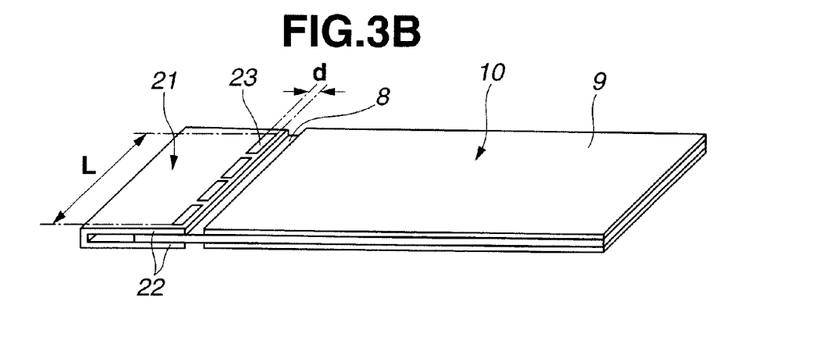

Referring to FIGS. 3A and 3B, a lithium ion secondary battery according to a second embodiment will be described.

The lithium ion second battery of the second embodiment differs from the first embodiment in that an electroconductive plate 21 is formed with a conductor folded section 22 so as to be two-layered in its entirety. Namely, as shown in FIG. 3A, a film employed as a material of the electroconductive plate 21 is folded at a central portion so that two side end portions, one of which has reversed front and back sides, are opposed at the sides for contact with the negative collector 8 while providing a spacing therebetween. As shown in FIG. 3B, the negative collector 8 has a side end portion that is engaged in the spacing of the folded section 22 thereby being brought into contact with the same. By this, the opposed surfaces of the electroconductive plate 21 are brought into surface-to-surface contact with the surfaces of both of the first electrically conductive layer 16A and the second electrically conductive layer 16B of the negative collector 8 so that the first electrically conductive layer 16A and the second electrically conductive layer 16B are electrically connected to each other by way of the electroconductive plate 21. Further, the electroconductive plate 21 and the negative collector 8 are joined at the folded section 22 in surface-to-surface contact therewith by ultrasonic joining similarly to the first embodiment to thereby form joining portions 23. In this embodiment, the electroconductive plate (conductive portion) 21 and the negative collector (multilayered portion) 8 are joined together to form a single multilayered collector assembly.

In the meantime, since the lithium ion secondary battery of this embodiment has substantially the same structure as the first embodiment except for the structure described as above, description thereto is omitted for brevity.

The lithium ion secondary battery according to the second embodiment can reduce the contact resistance without causing reduction of the volumetric energy density of the battery and thereby attain an excellent battery capacity, while being capable of absorbing the vibration transmitted from the negative pole terminal 14 by means of the electroconductive plate 21 and thereby improving the durability and the resistance to vibration.

Further, since the joining portions 23 are provided at the folded section 22, the surface contact can be attained more assuredly.

Third Embodiment

Figure 4A:
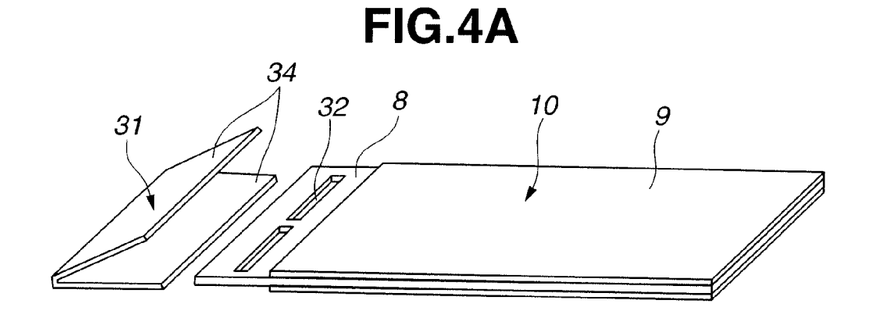
Figure 4B:
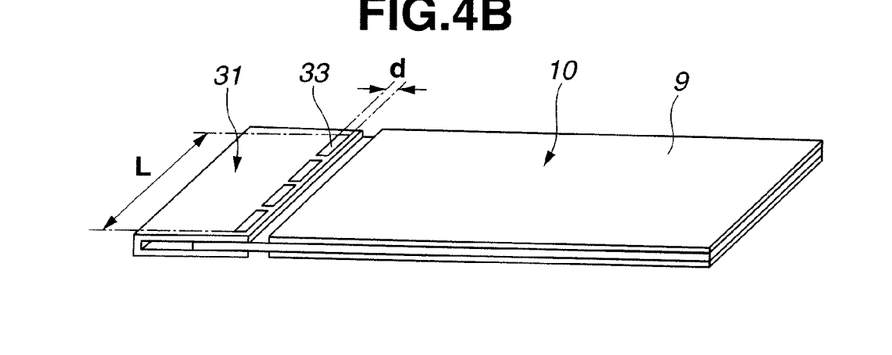

The third embodiment is substantially similar to the second embodiment except that as shown in FIG. 4A the negative collector 8 is provided with openings 32. The openings 32 are formed so as to correspond in position to joining portions 33 so that the joining portions 33 are made up of only sections of the electroconductive plate 31, which are prepared by folding the electroconductive plate 31 so as to oppose to each other and joined together. In this embodiment, the electroconductive plate (conductive portion) 31 and the negative collector (multilayered portion) 8 are joined together to form a single collector assembly. By such a structure, the surface of the electroconductive plate 31 is brought into surface-to-surface contact with both of the first electrically conductive layer 16A and the second electrically conductive layer 16B at a folded section 34 so that the first electrically conductive layer 16A and the second electrically conductive layer 16B are electrically connected to each other by way of the electroconductive plate 31.

In the meantime, the lithium ion secondary battery of this embodiment has substantially the same structure as the first embodiment except for the structure as described above, repeated description thereto is omitted for brevity.

The lithium ion secondary battery according to the third embodiment can reduce the contact resistance without causing reduction of the volumetric energy density of the battery and thereby attain an excellent battery capacity, and also absorb the vibration transmitted from the negative pole terminal 14 by means of the electroconductive plate 31 to thereby improve the durability and the resistance to vibration.

Further, since the joining portions 33 are provided at the folded section 34, the surface-to-surface contact can be attained more assuredly.

Fourth Embodiment

Figure 5A:
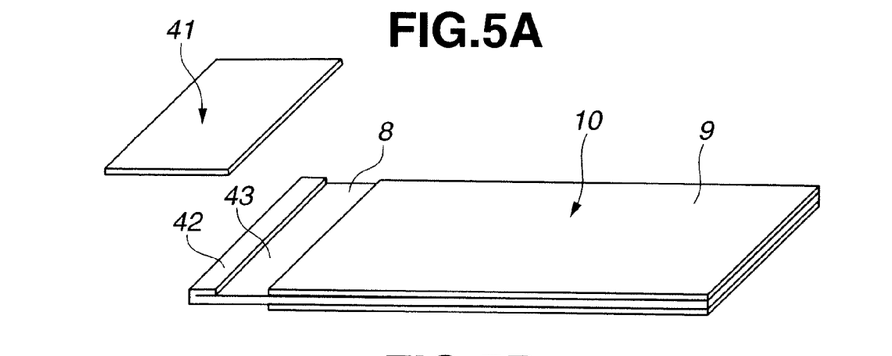
Figure 5B:
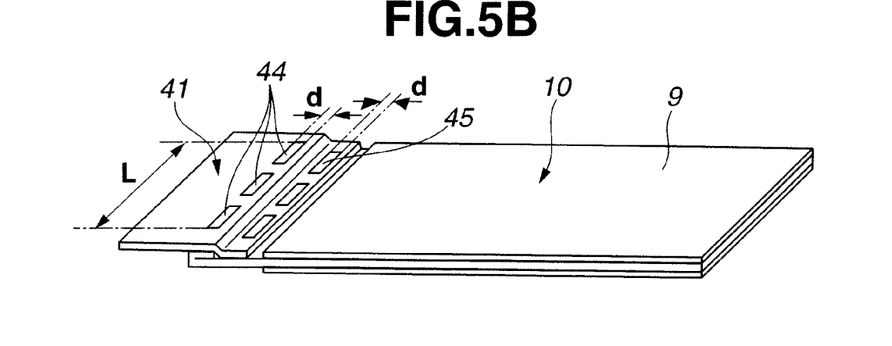

Referring to FIGS. 5A and 5B, the lithium ion secondary battery according to the fourth embodiment will be described.

In the lithium ion secondary battery of the fourth embodiment, the negative collector 8 is formed with a folded section 42 in which surfaces folded to oppose to each other are brought into contact with each other. Further, the electroconductive plate 41 is not formed with such a folded section as in the first embodiment and brought into contact at one side with the side of the negative collector 8 at which the folded section 42 is formed. Further, the electroconductive plate 41 is brought into contact not only with the folded section 42 but with a contact surface (non-folded section) 43 positioned on the inner side of the folded section 42, i.e., on the side of the folded section 42, which is closer to the active material layer 9. By this, the electroconductive plate 41 is brought into surface-to-surface contact with both of the first electrically conductive layer 16A and the second electrically conductive layer 16B of the negative collector 8 so that the first electrically conductive layer 16A and the second electrically conductive layer 16B are electrically connected to each other by way of the electroconductive plate 41. Further, the electroconductive plate 41 and the negative collector 8 are joined at the folded section 42 by ultrasonic joining to thereby form first joining portions 44. Further, the electroconductive plate 41 and the negative collector 8 are joined at the contact surface 43 by ultrasonic joining to thereby form second joining portions 45. In this embodiment, the electroconductive plate (conductive portion) 41 and the negative collector (multilayered portion) 8 are joined to form a single multilayered collector assembly.

In the meantime, the lithium ion secondary battery of this embodiment has substantially the same structure as the first embodiment except for the structure described as above, repeated description thereto is omitted for brevity.

Similarly to the first embodiment, the lithium ion secondary battery according to the fourth embodiment can reduce the contact resistance without causing reduction of the volumetric energy density of the battery and thereby attain an excellent battery capacity, and also can absorb the vibration transmitted from the negative pole terminal 14 by means of the electroconductive plate 41 to thereby improve the durability and the resistance to vibration.

Further, since the joining portions 44 and 45 are provided at the folded section 42 and at the contact surface 43, the surface-to-surface contact can be attained more assuredly.

Fifth Embodiment

Figure 6A:
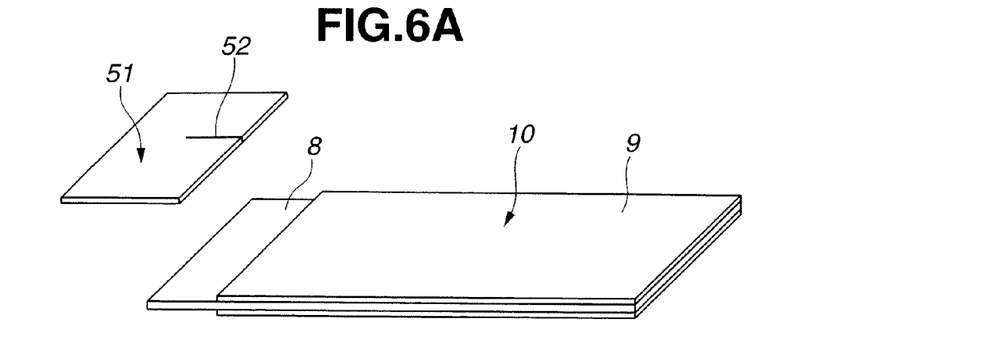
Figure 6B:
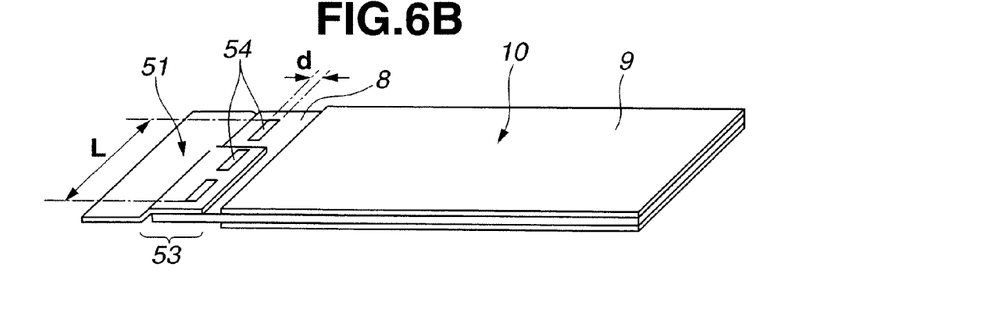

Referring to FIGS. 6A and 6B, a lithium ion secondary battery according to the fifth embodiment will be described.

In the lithium ion secondary battery of the fifth embodiment, an electroconductive plate 51, as shown in FIG. 5A, is formed, at an end side for contact with the negative collector 8, with a cut 52 extending lengthwise from a terminal end. The negative collector 8 is not formed with any fold or cut. As shown in FIG. 6B, at the side end formed with the cut 52, the electroconductive plate 51 is brought into contact, at one side (this side in FIGS. 6A and 6B) of the cut 52, with one surface (upper surface) of the positive collector 8 and, at the other side (remoter side in FIGS. 6A and 6B) of the cut 51, with the other surface (lower surface) of the positive collector 8. By this, there is formed a laminated portion 53 in which the negative collector 8 and the electroconductive plate 51 are laminated one upon the other. Accordingly, the electroconductive plate 51 is brought into surface-to-surface contact with both of the first electrically conductive layer 16A and the second electrically conductive layer 16B so that the first electrically conductive layer 16A and the second electrically conductive layer 16B are electrically connected to each other by way of the electroconductive plate 51. Further, similarly to the first embodiment, the electroconductive plate 51 and the negative collector 8 are joined at the laminated portion 53 by ultrasonic joining by applying thereto an ultrasonic energy to thereby forming joining portions 54. In this embodiment, the electroconductive plate (conductive portion) 51 and the negative collector (multilayered portion) 8 are joined to form a single multilayered collector assembly.

In the meantime, the lithium ion secondary battery has substantially the same structure as the first embodiment except for the structure described as above, repeated description thereto is omitted for brevity.

Similarly to the first embodiment, the lithium ion secondary battery according to the fifth embodiment can reduce the contact resistance without causing reduction of the volumetric energy density of the battery and thereby attain an excellent battery capacity, and also can absorb the vibration transmitted from the negative pole terminal 14 by means of the electroconductive plate 51 to thereby improve the durability and the resistance to vibration.

Further, since the electroconductive plate 51 that is a part independent from the negative pole terminal 14 and the negative collector 8 is disposed therebetween, it can absorb vibrations transmitted thereto from the negative pole terminal 14, thus making it possible to improve the durability and the resistance to vibration.

Sixth Embodiment

Figure 7A:
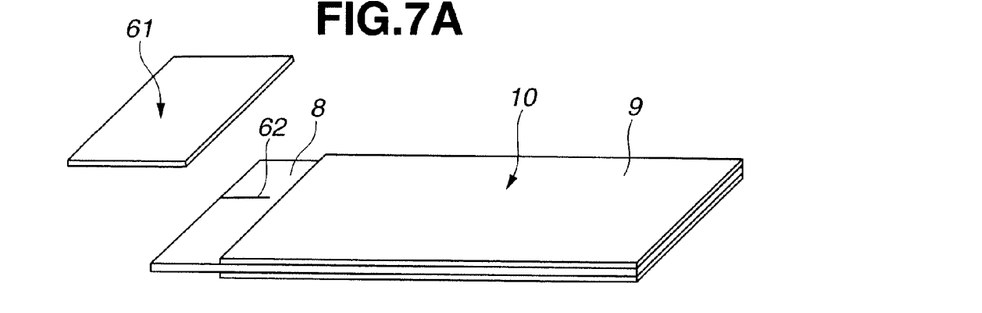
Figure 7B:
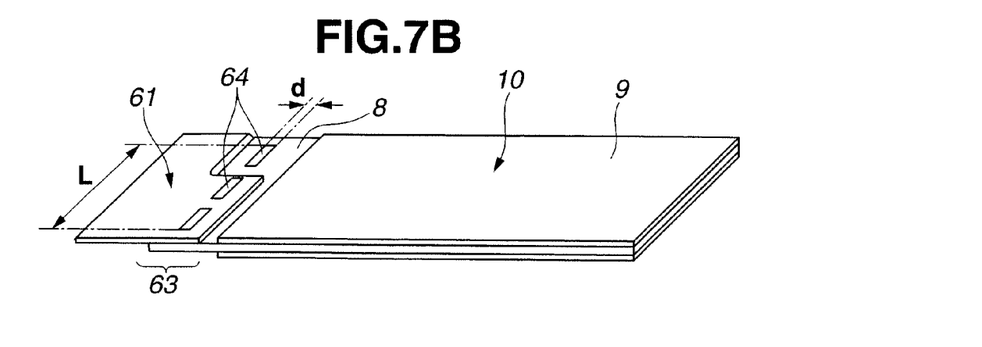

Referring to FIGS. 7A and 7B, a lithium ion secondary battery according to a sixth embodiment will be described.

In the lithium ion secondary battery of the sixth embodiment, the negative collector 8, as shown in FIG. 7A, is formed, at an end side for contact with an electroconductive plate 61, with a cut 62 extending lengthwise from a terminal end. Further, the electroconductive plate 61 is not formed with any fold or cut. As shown in FIG. 7B, at the side end formed with the cut 62, the electroconductive plate 61 is brought into contact, at one side (this side in FIGS. 7A and 7B) of the cut 62, with one surface (upper surface) of the positive collector 8 and, at the other side (remoter side in FIGS. 7A and 7B) of the cut 62, with the other surface (lower surface in the figures) of the positive collector 8. By this, there is formed a laminated portion 63 in which the negative collector 8 and the electroconductive plate 61 are laminated one upon the other. Accordingly, the electroconductive plate 61 is brought into surface-to-surface contact with both of the first electrically conductive layer 16A and the second electrically conductive layer 16B so that the first electrically conductive layer 16A and the second electrically conductive layer 16B are electrically connected to each other by way of the electroconductive plate 61. Further, similarly to the first embodiment, the electroconductive plate 61 and the negative collector 8 are joined at the laminated portion 53 by ultrasonic joining by applying thereto an ultrasonic energy to thereby form joining portions 64. In this embodiment, the electroconductive plate (conductive portion) 61 and the negative collector (multilayered portion) 8 are joined to form a single multilayered collector assembly.

In the meantime, the lithium ion secondary battery has substantially the same structure as the first embodiment except for the structure described as above, repeated description thereto is omitted for brevity.

Similarly to the first embodiment, the lithium ion secondary battery according to the fifth embodiment can reduce the contact resistance without causing reduction of the volumetric energy density of the battery and thereby attain an excellent battery capacity, and also can absorb the vibration transmitted from the negative pole terminal 14 by means of the electroconductive plate 51 to thereby improve the durability and the resistance to vibration.

Further, since the laminated portion 63 at which the electroconductive plate 61 and the negative collector 8 are brought into surface-to-surface contact with each other is formed with the joining portions 64, the surface-to-surface contact can be attained more assuredly.

Seventh Embodiment

Figure 8A:
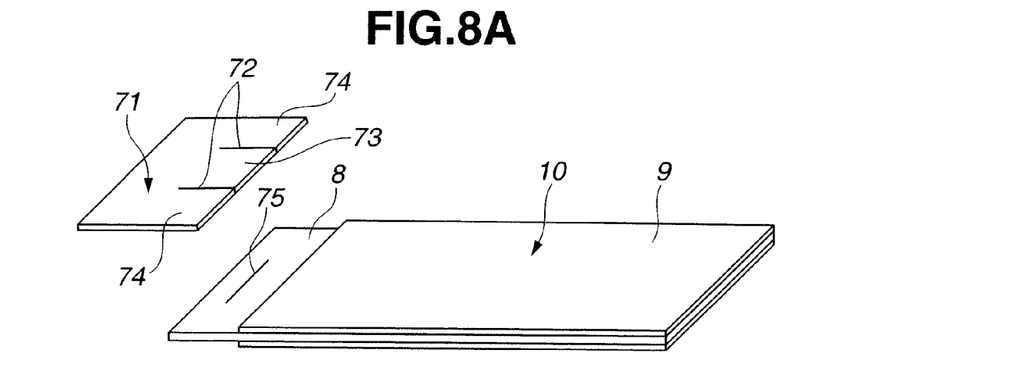
Figure 8B:
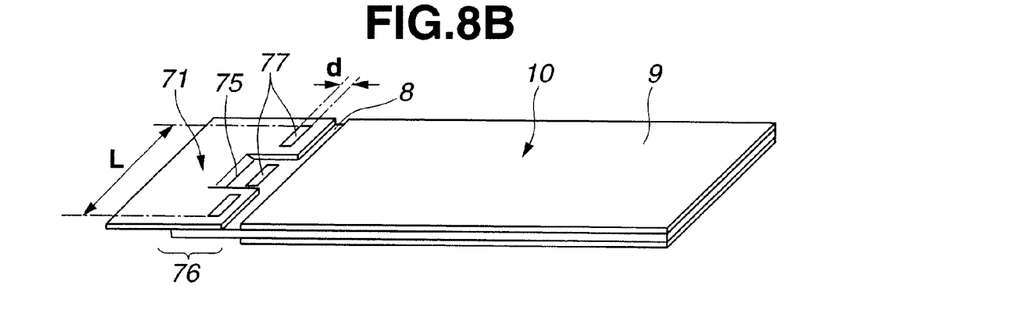

Referring to FIGS. 8A and 8B, a lithium ion secondary battery according to the seventh embodiment will be described.

In the lithium ion secondary battery of the seventh embodiment, the electroconductive plate 71, as shown in FIG. 8A, is formed, at an end side for contact with the negative collector 8, with two parallel cuts 72 extending lengthwise from a terminal end. By this, between the two cuts 72 is provided an insertion tongue 73 extending lengthwise toward a terminal end, and on the opposite sides of the insertion tongue 73 are provided lateral tongues 74. Further, the negative collector 8 is formed, at an end side for contact with the electroconductive plate 71, with an insertion hole 75 in the form of a slit-like cut extending laterally or widthwise. As shown in FIG. 8B, the insertion tongue 73 is inserted into the insertion hole 75 from one side (upper side in FIGS. 8A and 8B). By this, the lateral tongues 74 are brought into surface-to-surface contact with one surface (upper surface in FIGS. 8A and 8B) of the negative collector 8 and the insertion tongue 73 is brought into surface-to-surface contact with the other surface (lower surface in FIGS. 8A and 8B). By this, there is formed a laminated portion 76 at which the negative collector 8 and the electroconductive plate 71 are laminated one upon the other. Accordingly, the electroconductive plate 71 is brought into surface-to-surface contact with both of the first electrically conductive layer 16A and the second electrically conductive layer 16B of the negative collector 8 so that the first electrically conductive layer 16A and the second electrically conductive layer 16B are electrically connected with each other by way of the electroconductive plate 71. Further, similarly to the first embodiment, the electroconductive plate 71 and the negative collector 8 are joined at the laminated portion 76 by ultrasonic joining to thereby form joining portions 77. In this embodiment, the electroconductive plate (conductive portion) 71 and the negative collector (multilayered portion) 8 are joined to form a single multilayered collector assembly.

In the meantime, the lithium ion secondary battery has substantially the same structure as the first embodiment except for the structure described as above, repeated description thereto is omitted for brevity.

Similarly to the first embodiment, the lithium ion secondary battery according to the seventh embodiment can reduce the contact resistance without causing reduction of the volumetric energy density of the battery and thereby attain an excellent battery capacity, and also can absorb the vibration transmitted from the negative pole terminal 14 by means of the electroconductive plate 71 to thereby improve the durability and the resistance to vibration.

Further, since the laminated portion 76 at which the electroconductive plate 71 and the negative collector 8 are brought into surface-to-surface contact with each other is formed with the joining portions 77, the surface-to-surface contact can be attained more assuredly.

Eighth Embodiment

Figure 9A:
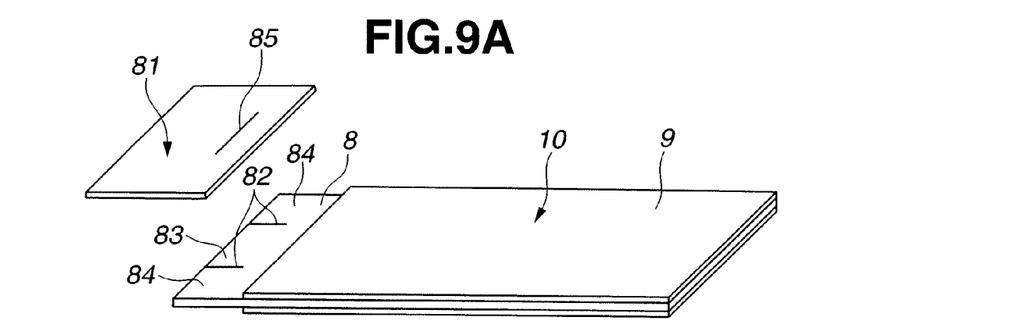
Figure 9B:
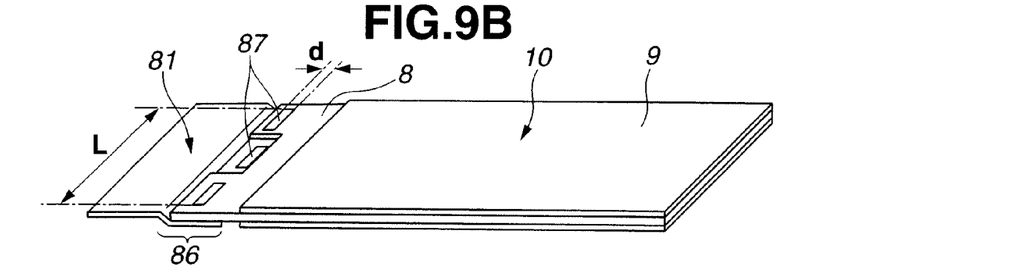

Referring to FIGS. 9A and 9B, a lithium ion secondary battery according to an eighth embodiment will be described.

In the lithium ion secondary battery of the eighth embodiment, the negative collector 8, as shown in FIG. 9A, is formed, at an end side for contact with the electroconductive plate 81, with two parallel cuts 82 extending lengthwise from a terminal end. Between the two cuts 82 is provided an insertion tongue 83 extending lengthwise toward a terminal end, and on the opposite sides of the insertion tongue 83 are provided lateral tongues 84. Further, the electroconductive plate 81 is formed, at an end side for contact with the negative collector 8, with an insertion hole 85 in the form of a slit-like cut extending laterally or widthwise. As shown in FIG. 9B, the insertion tongue 83 is inserted into the insertion hole 85 from one side (upper side in FIGS. 9A and 9B) By this, the lateral tongues 84 are brought into surface contact with one surface (upper surface in FIGS. 8A and 8B) of the electroconductive plate 81 and the insertion tongue 83 is brought into surface contact with the other surface (lower surface in FIGS. 9A and 9B). By this, there is formed a laminated portion 86 at which the negative collector 8 and the electroconductive plate 81 are laminated one upon the other. Accordingly, the electroconductive plate 81 is brought into surface-to-surface contact with both of the first electrically conductive layer 16A and the second electrically conductive layer 16B of the negative collector 8 so that the first electrically conductive layer 16A and the second electrically conductive layer 16B are electrically connected with each other by way of the electroconductive plate 81. Further, similarly to the first embodiment, the electroconductive plate 81 and the negative collector 8 are joined at the laminated portion 86 by ultrasonic joining to thereby form joining portions 87. In this embodiment, the electroconductive plate (conductive portion) 81 and the negative collector (multilayered portion) 8 are joined to form a single multilayered collector assembly.

In the meantime, the lithium ion secondary battery has substantially the same structure as the first embodiment except for the structure described as above, repeated description thereto is omitted for brevity.

Similarly to the first embodiment, the lithium ion secondary battery according to the eighth embodiment can reduce the contact resistance without causing reduction of the volumetric energy density of the battery and thereby attain an excellent battery capacity, and also can absorb the vibration transmitted from the negative pole terminal 14 by means of the electroconductive plate 81 to thereby improve the durability and the resistance to vibration.

Further, since the laminated portion 86 at which the electroconductive plate 81 and the negative collector 8 are brought into surface-to-surface contact with each other is formed with the joining portions 87, the surface-to-surface contact can be attained more assuredly.

Ninth Embodiment

Figure 10:
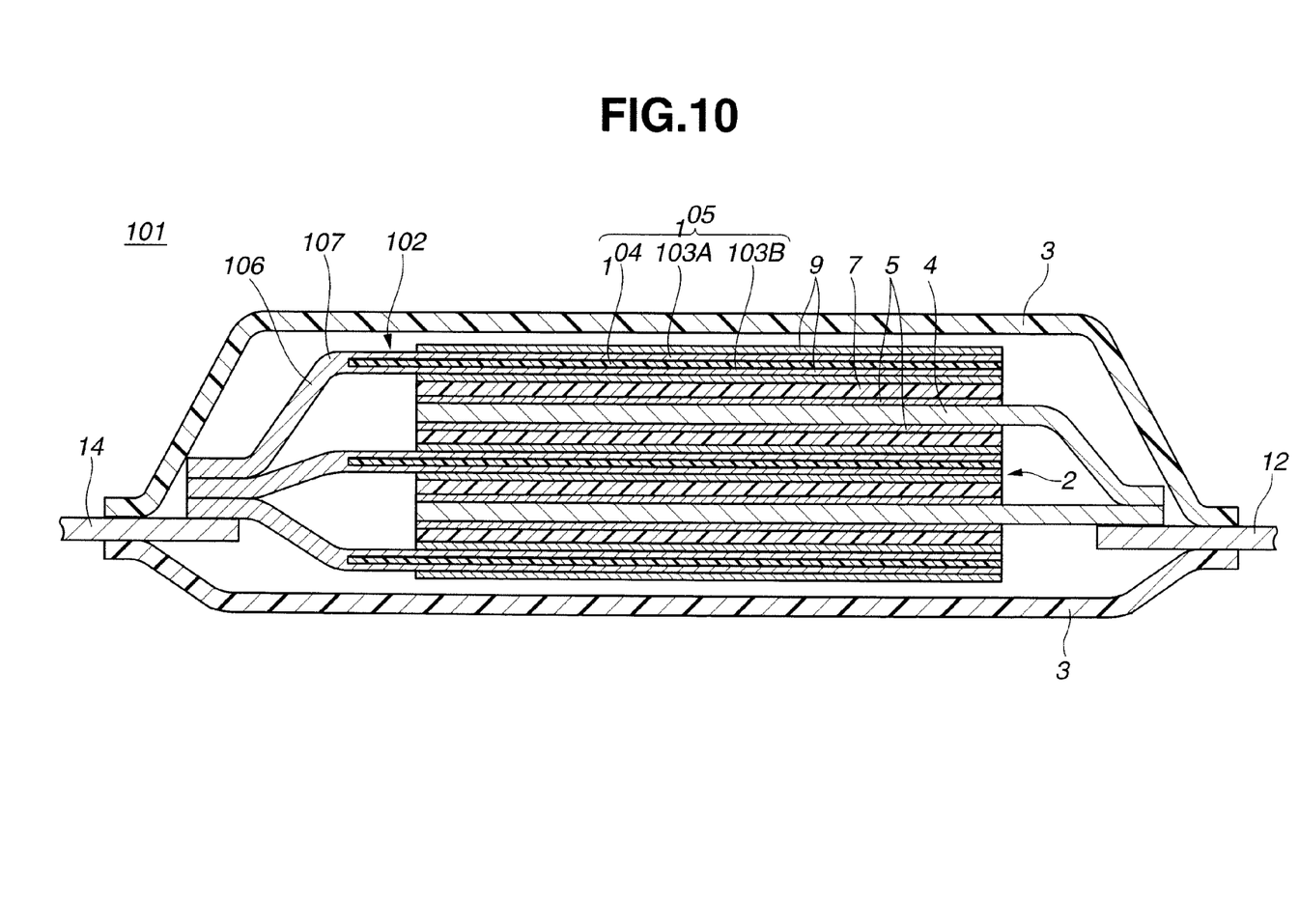
FIG. 10 is a schematic sectional view of a battery element of a lithium ion secondary battery according to a ninth embodiment.

Referring to FIG. 10, a lithium ion secondary battery 101 according to the ninth embodiment will be described.

In the lithium ion secondary battery 101 of the ninth embodiment, the negative collector 102, as shown in FIG. 10, includes a three-layered laminate portion 105 made up of a first electrically conductive layer 103A, an insulation layer 104 and a second electrically conductive layer 103B, and a conductive portion 106. The conductive portion 106 is provided so as to extend more toward a side end of a negative collector 102 than a side end of the insulation layer 104 and made of only a conductive material so as to be integral with the first electrically conductive layer 103A and the second electrically conductive layer 103B. Namely, in this embodiment, differing from the first to eighth embodiments, the electroconductive plate (conductive portion) 106 is not provided as an independent part but provided to a portion of the negative collector 102. Accordingly, while in the first to eighth embodiments a single multilayered collector assembly is constituted by joining the negative collector 8 that is an independent part and the electroconductive plate 13, the negative collector 102 in the ninth embodiment is integrally formed with the laminate portion 105 and the conductive portion 105 so that the negative collector 102 itself is formed as a multilayered collector assembly.

At least one negative collector 102 is formed at a side end with a bent portion 107 in order to be connected to the negative pole terminal 14. The insulation layer 104 is disposed inside the bent portion 107 (closer to the side where the battery element is constructed). The conductive portions 106 are laminated one upon another and connected to the negative pole terminal 14. Otherwise, the conductive portions 16 may be connected separately to the negative terminal 14 without being laminated one upon another.

Since with the lithium ion secondary battery 101 of the ninth embodiment, the conductive portion 106 which is not provided with any insulation layer 104 is formed integral with the first electrically conductive layer 103A and the second electrically conductive layer 103B and is therefore not required to be connected to an electroconductive plate as in the first to eighth embodiments, it can be connected to the negative pole terminal 14 without increasing the contact resistance while attaining electrical connection between the first electrically conductive layer 103A and the second electrically conductive layer 103B sufficiently. Further, this embodiment makes it possible to realize a thin, multilayered collector assembly and reduce the contact resistance to thereby obtain an excellent battery capacity without causing reduction in the volumetric energy density of the battery.

Tenth Embodiment

Figure 11:
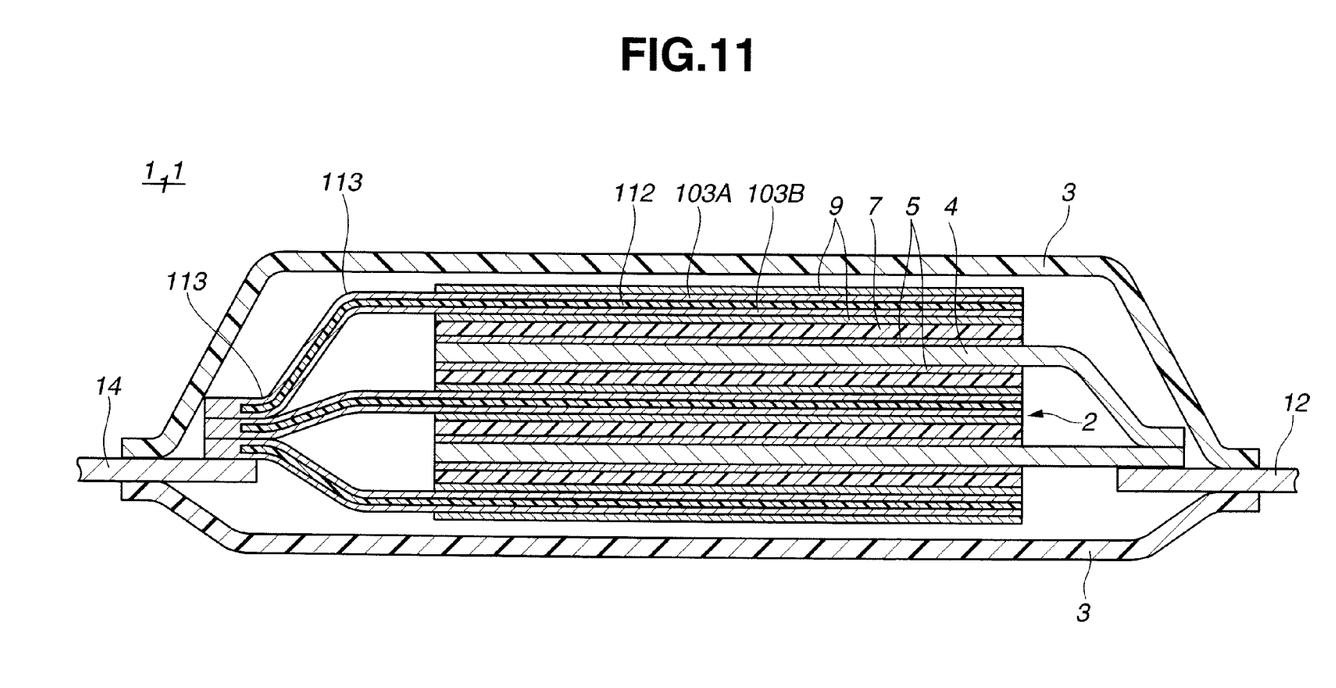
FIG. 11 is a schematic sectional view of a lithium ion secondary battery according to a tenth embodiment.

Referring to FIG. 11, a lithium ion secondary battery 111 according to a tenth embodiment will be described.

The lithium ion secondary battery of the tenth embodiment is substantially similar to the ninth embodiment except that an insulation layer 112 is formed so as to extend closer to the side end of the negative collector than bent portions 113.

With the lithium ion secondary battery 111 of the tenth embodiment, the same effect as the ninth embodiment can be obtained. Further, since the insulation layer 112 is formed so as to exist at the bent portions 113, the strength of the bent portions 113 is increased, thus making it possible to improve the durability and the resistance to vibration.

Modification

Figure 12:
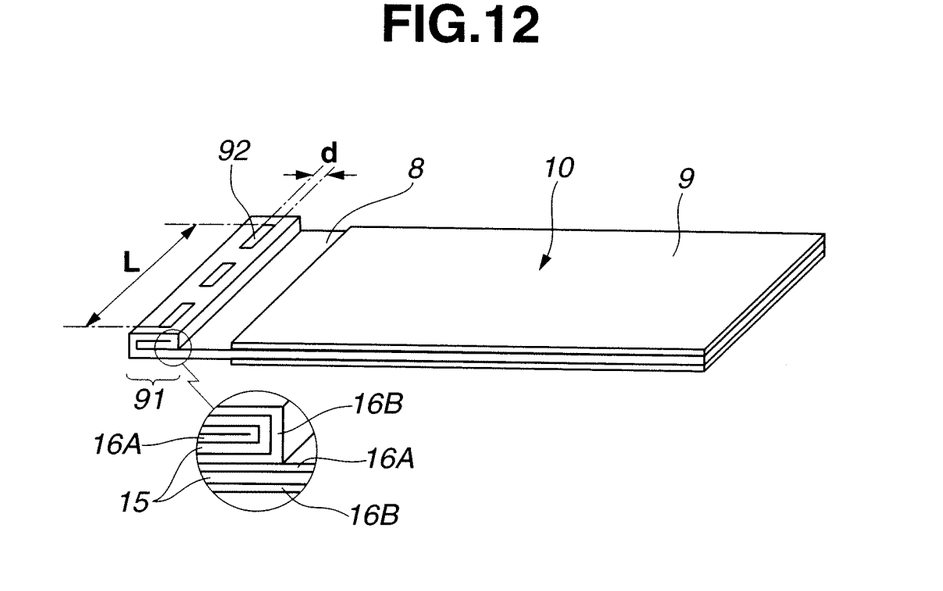
FIG. 12 is a perspective view of a negative electrode of a lithium ion secondary battery according to a modification of the present invention.

Referring to FIG. 12, a lithium ion secondary battery according to a modification of the present invention will be described.

In the lithium ion secondary battery according to the modification, the negative collector 8, as shown in FIG. 12, is double-folded at a side end in the same rotational direction so as to constitute a three-layered folded section 91. By this, the first electrically conductive layer 16A and the second electrically conductive layer 16B of the negative collector 8 is directly brought into surface-to-surface contact with each other. Namely, the first electrically conductive layer 16A and the second electrically conductive layer 16B themselves function at the folded section 91 as a conductive portion and are electrically connected to each other. Further, the folded section 91 of the negative collector 8 is subjected to ultrasonic joining to form joining sections 92.

With the lithium ion current collector according to the modification, the first electrically conductive layer 16A and the second electrically conductive layer 16B are directly brought into surface-to-surface contact with each other so that a sufficient contact area is obtained between the first electrically conductive layer 16A and the second electrically conductive layer 16B. Accordingly, it becomes possible to realize a thin, multilayered collector assembly, together with sufficient electrical connection between the first electrically conductive layer 16A and the second electrically conductive layer 16B by the effect of the large contact area therebetween, such that the contact resistance can be reduced without causing reduction in the volumetric energy density of the battery, thus making it possible to attain an excellent battery capacity.

Further, since the folded section 91 in which the first electrically conductive layer 16A and the second electrically conductive layer 16B are brought into surface-to-surface contact with each other is provided with the joining sections 92, the surface-to-surface contact can be attained assuredly.

Further, since the folded section 91 is provided between the negative pole terminal 14 (refer to FIG. 1) and the negative collector 8, the folded section 91 can absorb the vibration transmitted thereto from the negative pole terminal, thus making it possible to improve the durability and the resistance to vibration.

Experimental Test

Test samples 1 to 9 corresponding to the first to eighth embodiments and modification were prepared and subjected to a tensile test and a test for measuring a damping ratio. As shown in FIGS. 2B to 9B, each of the test samples 1 to 8 is made up of one negative pole and one electroconductive plate which are selected from the negative poles and electroconductive plates which are joined together to constitute a lithium ion secondary battery according to each of the first to eighth embodiments. As shown in FIG. 9, the test sample 9 is made up of one selected negative pole whose side end is folded so as to be three-layered and joined together. Any of the test samples 1 to 9 is a multilayered current collector film (multilayered collector assembly) in which polyimide is used for the insulation layer 15 of the negative collector 8 and copper film is used for the first electrically conductive layer 16A and the second electrically conductive layer 16B. The electroconductive plates 13, 21, 31, 41, 51, 61, 71 and 81 of the test samples 1 to 8 are copper films. In the ultrasonic joining of any of the test samples, an ultrasonic horn was pushed against the test piece under the pressure of 13 to 15 psi, and the joining portions 19, 23, 33, 44, 45, 54, 64, 77 and 87 and joining section 92 of the joining width d of 4 mm and the joining length L of 40 mm were formed by applying thereto an ultrasonic wave with the frequency of 20 KKz and the output of 70 to 80 J was for 0.5 to 0.7 seconds.

In the tensile test, the electroconductive plates 13, 21, 31, 41, 51, 61, 71 and 81 in case of the test samples 1 to 8 and the end portion of the negative pole 10, at which the current collector folded section 91 was provided, in case of the test sample 9 were pulled in the direction to separate them from the negative pole 10 (in the left-hand direction in FIGS. 2A, 2B to 10A, 10B) at the pulling speed of 10 mm/min. to measure the load for the stroke. The result is shown in Table 1.

TABLE 1

|  | Strength [N/mm] |
| --- | --- |
| Test sample 1 | 113 |
| Test sample 2 | 118 |
| Test sample 3 | 107 |
| Test sample 4 | 98 |
| Test sample 5 | 90 |
| Test sample 6 | 95 |
| Test sample 7 | 92 |
| Test sample 8 | 89 |
| Test sample 9 | 111 |

In the test for measuring the damping ratio, an acceleration sensor was set at the negative pole 10 so as to be able to measure an acceleration in the direction perpendicular to the surface of the negative pole 10, and the electroconductive plates 12, 21, 31, 41, 51, 61, 71 and 81 in case of the test samples 1 to 8 and the end portion of the negative pole, at which the current collector folded section 91 was provided, in case of the sample 9 were vibrated perpendicularly to the surfaces thereof using an impulse hammer. An vibration signal and a response signal at this time were obtained from the impulse hammer and the acceleration sensor and inputted to an FFT analyzer to calculate a frequency response function. Further, from the frequency response function, the damping ratio was calculated. The result is shown in Table 2.

TABLE 2

|  | Damping ratio [%] |
| --- | --- |
| Test sample 1 | 1.80 |
| Test sample 2 | 1.89 |
| Test sample 3 | 2.08 |
| Test sample 4 | 1.82 |
| Test sample 5 | 1.52 |
| Test sample 6 | 1.60 |
| Test sample 7 | 1.63 |
| Test sample 8 | 1.55 |
| Test sample 9 | 1.78 |

From the result of Table 1, it was confirmed that any of the test samples could attain a sufficiently high joining strength. Further, from the result of the test for measuring the damping ratio, it was confirmed that any of the test samples could attain a sufficiently high damping ratio and could have a high durability and a high resistance to vibration. Further, it was confirmed that of those test samples, particularly the test samples 1 to 3 corresponding to the first to third embodiments could realize a high joining strength, durability and resistance to vibration.

The entire contents of Japanese Patent Applications P2007-182542 (filed Jul. 11, 2007) and P2008-064318 (filed Mar. 13, 2008) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the multilayered collector assembly has been described as being applied to the negative collector 8, it can be applied to the positive collector 4. Further, in the ninth embodiment, it will suffice that the folded section 91 of the negative collector 8 is folded two times or more in the same rotational direction, e.g., it can be four-layered or more. Further, the laminate type battery is not limited to a lithium ion secondary battery. The scope of the invention is defined with reference to the following claims.

What is claimed is:

1. A battery, comprising:
   an electrode; and
   an electrode terminal,
   wherein the electrode comprises:
      a multilayered collector assembly having a multilayered portion and a conductive portion made of an electrically conductive material; and
      a pair of active material layers disposed on opposite sides of the multilayered portion,
   wherein the multilayered portion comprises an insulation layer and two electrically conductive layers disposed on opposite sides of the insulation layer,
   wherein the conductive portion connects to the two conductive layers and extends from the two conductive layers to the electrode terminal so as to establish electrical connection between the electrode terminal and the two conductive layers,
   wherein the conductive portion comprises an electroconductive plate which is a part independent from the multilayered portion and the electrode terminal,
   wherein the electroconductive plate has two opposite ends such that only one of the opposite ends is joined to the electrode terminal and only the other of the opposite ends is joined to respective surfaces of the two conductive layers so as to have surface-to-surface contact with the two conductive layers,
   wherein the multilayered portion constitutes one of a single positive collector and a single negative collector,
   wherein each of the electroconductive plate and the multilayered portion has a folded section formed such that the folded section of the electroconductive plate and the folded section of the multilayered portion are opened to opposite directions, and
   wherein a portion of the folded section of the electroconductive plate is inserted into the folded section of the multilayered portion and a portion of the folded section of the multilayered portion is inserted into the folded section of the electroconductive plate.

2. The battery of claim 1, wherein the electroconductive plate has a region located between the two opposite ends such that external surfaces of said region of the electroconductive plate are kept from contacting with the electrode terminal and the multilayered portion.

3. The battery of claim 2, wherein the other of the opposite ends of the electroconductive plate is connected to the two conductive layers at the folded section of the multilayered portion where the electroconductive plate and the multilayered portion are overlaid with each other, and wherein the electroconductive plate is joined to the two conductive layers to form joining portions.

4. The battery of claim 1, wherein the folded sections of the electroconductive plate and the multilayered portion are each formed with opposed surface sections,
   wherein one of the opposed surface sections of the folded section of the electroconductive plate is engaged between the opposed surface sections of the folded section of the multilayered portion, and
   wherein one of the opposed surface sections of the folded section of the multilayered portion is engaged between the opposed surface sections of the folded section of the electroconductive plate.

5. The battery of claim 1, wherein the folded sections of the electroconductive plate and the multilayered portion are each formed with opposed surface sections and a spacing disposed between the opposed surface sections, wherein one of the opposed surface sections of the folded sections of the electroconductive plate is engaged into the spacing of the folded section of the multilayered portion, and wherein one of the opposed surface sections of the folded section of the multilayered portion is engaged into the spacing of the folded section of the electroconductive plate.

6. The battery of claim 2, wherein the folded section of the electroconductive plate has opposite surface sections with a spacing disposed therebetween at the other of the opposite ends, and wherein the portion of the folded section of the multilayered portion is engaged in the spacing of the folded section of the electroconductive plate such that the multilayered portion is brought into surface-to-surface contact with the folded section of the electroconductive plate.

7. The battery of claim 1, wherein the insulation layer is extended up to a bent portion provided in the multilayered collector assembly.

8. The battery of claim 1, wherein the multilayered portion is the single positive collector, and wherein the two conductive layers comprise aluminum.

9. The battery of claim 1, wherein the multilayered portion is the single negative collector, and wherein the two conductive layers comprise copper.

10. The battery of claim 1, wherein the insulation layer of the multilayered portion is made of polyimide.

11. A laminate type battery comprising:
an electrode terminal; and
an electrode electrically connected at a side end to the electrode terminal and having a multilayered collector assembly,
wherein the multilayered collector assembly includes:
multilayered portion having an insulation layer and two electrically conductive layers disposed on opposite sides of the insulation layer; and
a conductive portion made of an electrically conductive material and extending between each of the two conductive layers and the electrode terminal to electrically connect the two conductive layers and the electrode terminal,
wherein the conductive portion extends from the two conductive layers to the electrode terminal so as to establish electrical connection between the electrode terminal and the two conductive layers and has a width that extends along an entire width of the two conductive layers such that the conductive portion contacts the two conductive layers,
wherein the conductive portion comprises an electroconductive plate which is a part independent from the multilayered portion and the electrode terminal,
wherein the electroconductive plate has two opposite ends such that only one of the opposite ends is joined to the electrode terminal and only the other of the opposite ends is joined to respective surfaces of the two conductive layers so as to have surface-to-surface contact with the two conductive layers,
wherein the electrode further includes a pair of active material layers disposed on opposite sides of the multilayered portion,
wherein the multilayered portion constitutes one of a single positive collector and a single negative collector,
wherein each of the electroconductive plate and the multilayered portion has a folded section formed such that the folded section of the electroconductive plate and the folded section of the multilayered portion are opened to opposite directions, and wherein a portion of the folded section of the electroconductive plate is inserted into the folded section of the multilayered portion and a portion of the folded section of the multilayered portion is inserted into the folded section of the electroconductive plate.

12. The laminate type battery of claim 11, wherein the electroconductive plate has a region located between the two opposite ends such that external surfaces of said region of the electroconductive plate are kept from contacting with the electrode terminal and the multilayered portion, wherein the folded section of one of the electroconductive plate and the multilayered portion is formed with opposed surface sections and a spacing disposed therebetween, and wherein the portion of the folded section of the other of the electroconductive plate and the multilayered portion is engaged in the spacing such that the one and the other of the electroconductive plate and the multilayered portion are brought into surface-to-surface contact with each other.

13. The laminate type battery of claim 11, wherein the folded sections of the electroconductive plate and the multilayered portion are each formed with opposed surface sections,
wherein one of the opposed surface sections of the folded section of the electroconductive plate is engaged between the opposed surface sections of the folded section of the multilayered portion, and
wherein one of the opposed surface sections of the folded section of the multilayered portion is engaged between the opposed surface sections of the folded section of the electroconductive plate.

14. The laminate type battery of claim 11, wherein one of the folded sections of the electroconductive plate and the multilayered portion are each formed with opposed surface sections and a spacing disposed between the opposed surface sections,
wherein one of the opposed surface sections of the folded section of the electroconductive plate is engaged into the spacing of the folded section of the multilayered portion, and
wherein one of the opposed surface sections of the folded section of the multilayered portion is engaged into the spacing of the folded section of the electroconductive plate.

15. The battery of claim 1, wherein the pair of active material layers are disposed on opposite sides of the multilayered portion such that each active material layer is in direct contact with its respective conductive layer, and wherein the two conductive layers are in direct contact with the insulation layer.

16. The laminate type battery of claim 11, wherein the pair of active material layers are disposed on opposite sides of the multilayered portion such that each active material layer is in direct contact with its respective conductive layer, and wherein the two conductive layers are in direct contact with the insulation layer.

17. A battery comprising:
an electrode terminal; and
an electrode comprising:
a conductive portion;
an insulation layer;
first and second electrically conductive layers disposed on opposite sides of the insulation layer;
a first active material layer disposed on the first electrically conductive layer; and
a second active material layer disposed on the second electrically conductive layer;

wherein the conductive portion connects to the first and second conductive layers and extends from the first and second conductive layers to the electrode terminal so as to establish electrical connection between the electrode terminal and the first and second conductive layers, wherein the conductive portion comprises an electroconductive plate, wherein the electroconductive plate has two opposite ends such that only one of the opposite ends is joined to the electrode terminal and only the other of the opposite ends is joined to respective surfaces of the first and second conductive layers so as to have surface-to-surface contact with the first and second conductive layers, wherein the first and second active material layers are immediately adjacent active material layers with the first and second conductive layers and the insulation layer disposed therebetween, wherein each of electroconductive plate and the first conductive layer has a folded section formed such that the folded section of the electroconductive plate and the folded section of the first conductive layer are opened to opposite directions, and wherein a portion of the folded section of the electroconductive plate is inserted into the folded section of the first conductive layer and a portion of the folded section of the first conductive layer is inserted into the folded section of the electroconductive plate.

18. The battery of claim 17, wherein the electroconductive plate has a region located between the two opposite ends such that external surfaces of said region of the electroconductive plate are kept from contacting with the electrode terminal and the first and second conductive layers.

19. The battery of claim 18, wherein the other of the opposite ends of the electroconductive plate is connected to the first and second conductive layers at the folded section of the first conductive layer where the electroconductive plate and the first and second conductive layers are overlaid with each other, and wherein the electroconductive plate is joined to the first and second conductive layers to form joining portions.

20. The battery of claim 18, wherein the folded section of the electroconductive plate at the other of the opposite ends has opposite surface sections with a spacing disposed therebetween, and wherein the portion of the folded section of the first conductive layer is engaged in the spacing of the folded section of the electroconductive plate.

21. The battery of claim 1, wherein the electroconductive plate has a planar portion extending between the two opposite ends, and wherein the planar portion has opposite facing external surfaces.

* * * * *